United States Patent
Walton et al.

(10) Patent No.: US 11,012,562 B1
(45) Date of Patent: May 18, 2021

(54) METHODS AND APPARATUS FOR ENSURING RELEVANT INFORMATION SHARING DURING PUBLIC SAFETY INCIDENTS

(71) Applicant: Motorola Solutions, Inc., Chicago, IL (US)

(72) Inventors: Brady Walton, Centerville, UT (US); Ernest Perkins, Layton, UT (US); Kylene Tanner, Bountiful, UT (US); Nicholas Paddock, Roy, UT (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/687,104

(22) Filed: Nov. 18, 2019

(51) Int. Cl.
  *H04M 3/51* (2006.01)
  *H04M 3/42* (2006.01)
  *H04W 4/90* (2018.01)

(52) U.S. Cl.
  CPC ..... *H04M 3/5116* (2013.01); *H04M 3/42221* (2013.01); *H04M 3/5183* (2013.01); *H04W 4/90* (2018.02); *H04M 2201/60* (2013.01); *H04M 2203/558* (2013.01); *H04M 2242/04* (2013.01)

(58) Field of Classification Search
  USPC ............................................. 379/33, 45, 48
  See application file for complete search history.

(56) References Cited

U.S. PATENT DOCUMENTS

| 10,210,869 B1* | 2/2019 | King .................. H04L 63/0861 |
| 10,276,031 B1 | 4/2019 | Ho et al. |
| 10,362,168 B1* | 7/2019 | Pitta Eswara Chandra ................. H04M 3/5116 |
| 2003/0028536 A1 | 2/2003 | Singh et al. |
| 2008/0037763 A1* | 2/2008 | Shaffer ............. H04M 3/42187 379/266.01 |
| 2013/0179415 A1* | 7/2013 | Auvenshine .......... G06F 16/215 707/696 |
| 2016/0358017 A1* | 12/2016 | Guzik ..................... G06F 3/048 |
| 2017/0098181 A1* | 4/2017 | Herman ................. G06N 5/003 |
| 2018/0248929 A1* | 8/2018 | Han ..................... H04L 65/601 |
| 2018/0352084 A1* | 12/2018 | Czachor, Jr. ......... H04M 3/5116 |

OTHER PUBLICATIONS

International Search Report and Written Opinion of International application No. PCT/US2020/060044, dated Feb. 4, 2021, 13 pages.

* cited by examiner

*Primary Examiner* — Maria El-Zoobi
(74) *Attorney, Agent, or Firm* — Baker Botts L.L.P.

(57) ABSTRACT

Methods for ensuring relevant information sharing during public safety incidents include monitoring inputs associated with a public safety incident, determining that an input includes information important or critical to communicate to a responding public safety officer, accessing communications with the officer, determining that the input has not been communicated to the officer, and initiating action to communicate the input to the officer. The input may include audio or video input, or a note composed by a dispatcher or call taker representing information provided by a person reporting the incident or obtained through a database query. Initiating action to communicate the input to the officer may include providing an indication to a dispatcher that the input includes important or critical information not yet communicated to the officer, providing data to the officer's vehicle-mounted communication device, or providing an audible alert or audio message to the officer's hand-held communication device.

20 Claims, 6 Drawing Sheets

METHODS AND APPARATUS FOR ENSURING RELEVANT INFORMATION SHARING DURING PUBLIC SAFETY INCIDENTS

BACKGROUND OF THE INVENTION

Public safety organizations may operate communication systems through which call takers communicate with citizens reporting public safety incidents and dispatchers communicate with public safety officers assigned to respond to those incidents. Call takers and dispatchers may enter information into a record associated with a public safety incident that, although it may be of importance to an officer en route to a reported incident or already on the scene, is not forwarded to the officer. This may be due to a lack of attention or a distraction on the part of the call taker or dispatcher, a belief that the information is already known, or simple human error, for example. As a result, officers in the field may miss critical information and may be put in dangerous situations due to the lack of communication of the critical information. In addition, officers may waste time on-scene collecting information that has already been communicated to the call taker or dispatcher and added to the record associated with the incident if that information is not provided to them in the field. In some cases, information is communicated to an officer en route to a reported incident or already on the scene in a manner that is not appropriate under the circumstances. For example, information displayed on a vehicle-mounted device is of little use when the officer is away from the vehicle.

Historically, software related to call taking tasks and dispatch-related software have executed on separate computing systems that do not communicate with each other in a manner that facilitates information sharing between the two systems. Information entered in one of the systems might not be shared with the other system and, as a result, might not be properly communicated to an officer en route to a reported incident or already on the scene regardless of its importance to the officer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
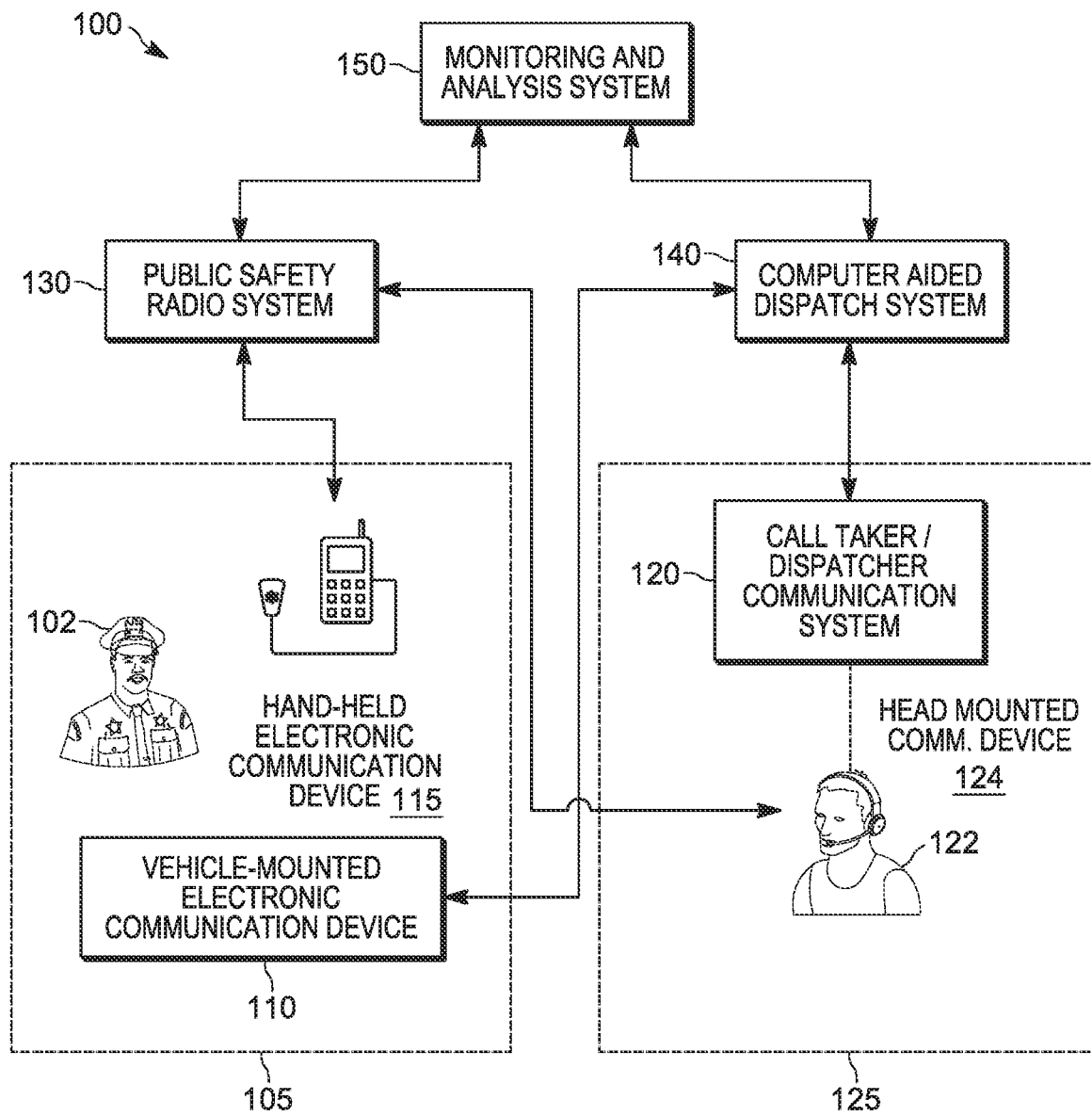
FIG. 1 is a block diagram illustrating selected elements of an example public safety communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for ensuring relevant information sharing in a public safety communication system during public safety incidents. In one embodiment, a disclosed method for ensuring relevant information sharing during public safety incidents includes monitoring, by an electronic computing device, a plurality of received inputs associated with a public safety incident, determining, by the electronic computing device, that a given one of the received inputs comprises information meeting first predefined criteria characterizing the information as important to communicate to a given public safety officer, accessing, by the electronic computing device, communications with the given public safety officer and associated with the public safety incident, determining, by the electronic computing device based on the accessed communications, that the given received input has not yet been communicated to the given public safety officer, and initiating, by the electronic computing device, action to communicate the given received input to the given public safety officer.

In one embodiment, a computer readable medium storing program instructions executable by a processor is disclosed. The program instructions are executable by the processor for performing monitoring, by an electronic computing device, a plurality of received inputs associated with a public safety incident, determining, by the electronic computing device, that a given one of the received inputs comprises information meeting first predefined criteria characterizing the information as important to communicate to a given public safety officer, accessing, by the electronic computing device, communications with the given public safety officer and associated with the public safety incident, determining, by the electronic computing device based on the accessed communications, that the given received input has not yet been communicated to the given public safety officer, and initiating, by the electronic computing device, action to communicate the given received input to the given public safety officer.

In any of the disclosed embodiments, the given public safety officer may be en route to or on site at the public safety incident.

In any of the disclosed embodiments, the given received input may include audio or video input comprising the information meeting the first predefined criteria, or may include a note composed by a public safety dispatcher or a call taker and comprising the information meeting the first predefined criteria, where the note represents information provided by a person reporting the public safety incident or information obtained through a query of a database accessible by the public safety dispatcher or call taker.

In any of the disclosed embodiments, the method may further include transcribing, by the electronic computing device, a call received from a person reporting the public safety incident, and the given received input may include a transcription of the call comprising the information meeting the first predefined criteria.

In any of the disclosed embodiments, the method may further include at least one of transcribing, by the electronic computing device in real time, radio communications with the given public safety officer and associated with the public safety incident, and storing, by the electronic computing device, data provided to a display of a vehicle-mounted electronic communication device associated with the given public safety officer. Accessing the communications with the given public safety officer and associated with the public safety incident may include accessing a real-time transcription of radio communications with the given public safety officer and associated with the public safety incident or accessing stored data provided to a display of a vehicle-mounted electronic communication device associated with the given public safety officer.

In various embodiments, initiating action to communicate the given received input to the given public safety officer may include providing an indication to the public safety dispatcher that the given received input comprises information meeting the first predefined criteria and that the given received input has not yet been communicated to the given public safety officer, providing data representing the given received input to a display of a vehicle-mounted electronic communication device associated with the given public safety officer, or providing an audible alert or audio message representing the given received input to a hand-held electronic communication device associated with the given public safety officer. The audible alert or audio message may be provided to the hand-held electronic communication device associated with the given public safety officer responsive to at least one of a determination, by the electronic computing device, that the received input comprises information meeting second predefined criteria characterizing the information as critical to communicate to the given public safety officer and a determination, by the electronic computing device, that the given public safety officer is not in a position to observe data provided to a display of a vehicle-mounted electronic communication device associated with the given public safety officer.

In one embodiment, a disclosed public safety communication system includes one or more input interfaces through which a plurality of received inputs associated with a public safety incident are received and a monitoring and analysis system. The monitoring and analysis system includes a processor and a memory storing program instructions that when executed by the processor cause the processor to perform determining that a given one of the received inputs comprises information meeting first predefined criteria characterizing the information as important to communicate to a given public safety officer, accessing communications with the given public safety officer and associated with the public safety incident, determining, based on the accessed communications, that the given received input has not yet been communicated to the given public safety officer, and initiating action to communicate the given received input to the given public safety officer.

In various embodiments, the public safety communication system may include a public safety radio system, a vehicle-mounted electronic communication device associated with the given public safety officer, an interface through which a public safety database is accessible by a public safety dispatcher or a call taker, and a memory configured to store transcriptions of communications with public safety officers over the public safety radio system and data provided to displays of vehicle-mounted electronic communication devices associated with public safety officers. The given received input may include one or more of audio or video input comprising the information meeting the first predefined criteria, a note composed by the public safety dispatcher or call taker and comprising the information meeting the first predefined criteria, the note representing information provided by a person reporting the public safety incident or information obtained through a query of the public safety database, and a transcription of a call received from a person reporting the public safety incident comprising the information meeting the first predefined criteria. Accessing the communications with the given public safety officer and associated with the public safety incident may include one or more of accessing, in the memory, a transcription of a communication with the given public safety officer over the public safety radio system and associated with the public safety incident and accessing, in the memory, data provided to a display of the vehicle-mounted electronic communication device associated with the given public safety officer.

In various embodiments, the public safety communication system may include one or more of a vehicle-mounted electronic communication device associated with the given public safety officer and a hand-held electronic communication device associated with the given public safety officer. Initiating action to communicate the given received input to the given public safety officer may include one or more of providing an indication to a public safety dispatcher that the given received input comprises information meeting the first predefined criteria and that the given received input has not yet been communicated to the given public safety officer, providing data representing the given received input to a display of the vehicle-mounted electronic communication device associated with the given public safety officer, and providing an audible alert or audio message representing the given received input to the hand-held electronic communication device associated with the given public safety officer.

In various embodiments, the public safety communication system may include a hand-held electronic communication device associated with the given public safety officer, and initiating action to communicate the given received input to the given public safety officer may include providing an audible alert or audio message representing the given received input to the hand-held electronic communication device associated with the given public safety officer responsive to one or more of a determination that the received input comprises information meeting second predefined criteria characterizing the information as critical to communicate to the given public safety officer, and a determination that the given public safety officer is not in a position to observe data provided to a display of a vehicle-mounted electronic communication device associated with the given public safety officer.

As noted above, in some existing public safety communication systems, in-field officers may miss critical information, and may be put in dangerous situations due to the lack of communication of the critical information. In some embodiments, the methods and apparatus described herein may address this issue by monitoring notes entered into a record by a call taker or a public safety dispatcher representing information obtained from citizen callers or on-scene officers during an active public safety incident, detecting that an entered note includes information that should be forwarded to an en route or on-scene officer, accessing communications with the en route or on-scene officer to determine that the information has not yet been communicated to the en route or on-scene officer, and taking action to cause the information to be appropriately relayed to the en route or on-scene officer.

For example, in at least some embodiments, the methods and apparatus described herein may detect, and take action to correct, situations in which important or critical information communicated to a call taker or a public safety dispatcher was not entered into a record associated with a reported public safety incident. In another example, the methods and apparatus described herein may detect, and take action to correct, situations in which important or critical information communicated to a call taker or a public safety dispatcher was entered into a record associated with a reported public safety incident but was not relayed to a responding public safety officer. In yet another example, the methods and apparatus described herein may detect, and take action to correct, situations in which critical information communicated to a call taker or a public safety dispatcher was entered into a record associated with a reported public safety incident and was relayed to a responding public safety officer using a method other than a preferred method for relaying critical information to the responding public safety office.

In some embodiments of the public safety communication systems described herein, real-time analytics may be applied to all of the received inputs that are associated with a reported public safety incident. In addition, transcriptions of incoming calls and communications between public safety dispatchers and responding offers may be generated in real time.

Referring now to FIG. 1, there is provided a block diagram illustrating selected elements of an example public safety communication system 100, in accordance with some embodiments. In the illustrated example, public safety communication system 100 includes, for a public safety dispatcher or call taker 122 at a central communication location 125, a communication system 120 for the public safety dispatcher or call taker 122 and a head mounted communication device 124 for the use of the public safety dispatcher or call taker 122. In the illustrated example, public safety communication system 100 also includes, for a responding public safety officer 102 at the site of a public safety incident 105 or en route to the incident site, a vehicle-mounted electronic communication device 110 and a hand-held electronic communication device 115. Also included in public safety communication system 100 are a public safety radio system 130, through which public safety dispatchers 122 and responding officers 102 can communicate during an active public safety incident, a computer aided dispatch (CAD) system 140, and a system-wide monitoring and analysis system 150. In some embodiments, software executing on CAD system 140 may perform or facilitate the gathering and analysis of information related to a given public safety incident and the relaying of certain portions of that information to public safety officers in the field. As described in more detail herein, monitoring and analysis system 150 may be configured to monitor inputs associated with a public safety incident, determine that an input includes information important or critical to communicate to a responding public safety officer, access communications with the responding public safety officer, determine that the important or critical information has not yet been communicated to the responding public safety officer, and initiate action to communicate the important or critical information to the responding public safety officer. In various embodiments, monitoring and analysis system 150 may be located in the central communication location 125 or at a location remote from the central communication location 125 and may be accessible to other elements of public safety communication system 100 over one or more wired or wireless public safety networks.

In one example, a call taker 122 may use a head mounted communication device 124 to speak with a citizen or public safety officer who calls a public safety hotline, such as a 911 emergency call center, to report a public safety incident. For example, the call taker 122 may receive information from the caller describing the incident, its location, and any involved persons, and may prompt the caller to provide additional information to assist in coordinating an appropriate response. In some embodiments, communication system 120 may implement the functionality of a public safety switchboard through which a call taker 122 can route incoming calls to the appropriate public safety functional unit or agency, such as a police force, fire department, or ambulance agency or unit thereof. In some embodiments, the call taker 122 may interact with communication system 120 to initiate the creation of an incident report for the reported public safety incident, if none exists, and to add notes to the incident report based on information provided by the caller during the incoming call. For example, the call taker 122 may provide instructions to create a new record for the reported public safety incident in CAD system 140 or to add notes to an existing record in CAD system 140 through a keyboard, graphical user interface, or other user input mechanism of communication system 120.

In another example, a public safety dispatcher 122 may use a head mounted communication device 124 to speak with a public safety officer 102 assigned to respond to a reported public safety incident while the officer is en route to the scene of the reported incident or while the officer is at the scene of the reported incident. In some embodiments, the public safety dispatcher 122 may communicate with the officer 102 using public safety radio system 130, which may operate on a public safety radio network, to provide instructions and other information to the officer 102 and to receive updates from the officer 102. In some embodiments, the public safety dispatcher 122 may interact with communication system 120 to initiate the relaying of information found in the record created for the reported public safety incident in CAD system 140. In one example, the public safety dispatcher 122 may enter or identify a subset of the notes included in the record for the reported incident that are important to relay to the officer 102 and may enter or select instructions for CAD system 140 to provide the subset of notes to a vehicle-mounted electronic communication device 110 for display to the officer 102 through a keyboard, graphical user interface, or other user input mechanism of communication system 120. In another example, the public safety dispatcher 122 may enter or identify a subset of the notes included in the record for the reported incident that are critical to relay to the officer 102 and may enter or select instructions for CAD system 140 to provide the subset of notes to a hand-held electronic communication device 115 associated with the officer 102 through a keyboard, graphical user interface, or other user input mechanism of communication system 120.

As illustrated in FIG. 1, communication system 120 may be a shared system used by both call takers and public safety dispatchers, in some embodiments. In other embodiments, public safety communication system 100 may include separate communication systems 120 for call takers and for public safety dispatchers.

In some embodiments of the public safety communication systems described herein, both a call taker and a public safety dispatcher may be assigned to handle a reported public safety incident. As described above, the call taker may receive an incoming call reporting the incident and may gather information from the caller over the phone, entering at least some of the gathered information as notes in a record associated with the reported incident. The public safety dispatcher may access the record and relay at least some of the entered notes, along with other information obtained by the public safety dispatcher, to a responding officer. In other embodiments, the tasks described herein as being performed by a call taker and the tasks described as being performed by a public safety dispatcher may be performed by the same person.

Figure 2:
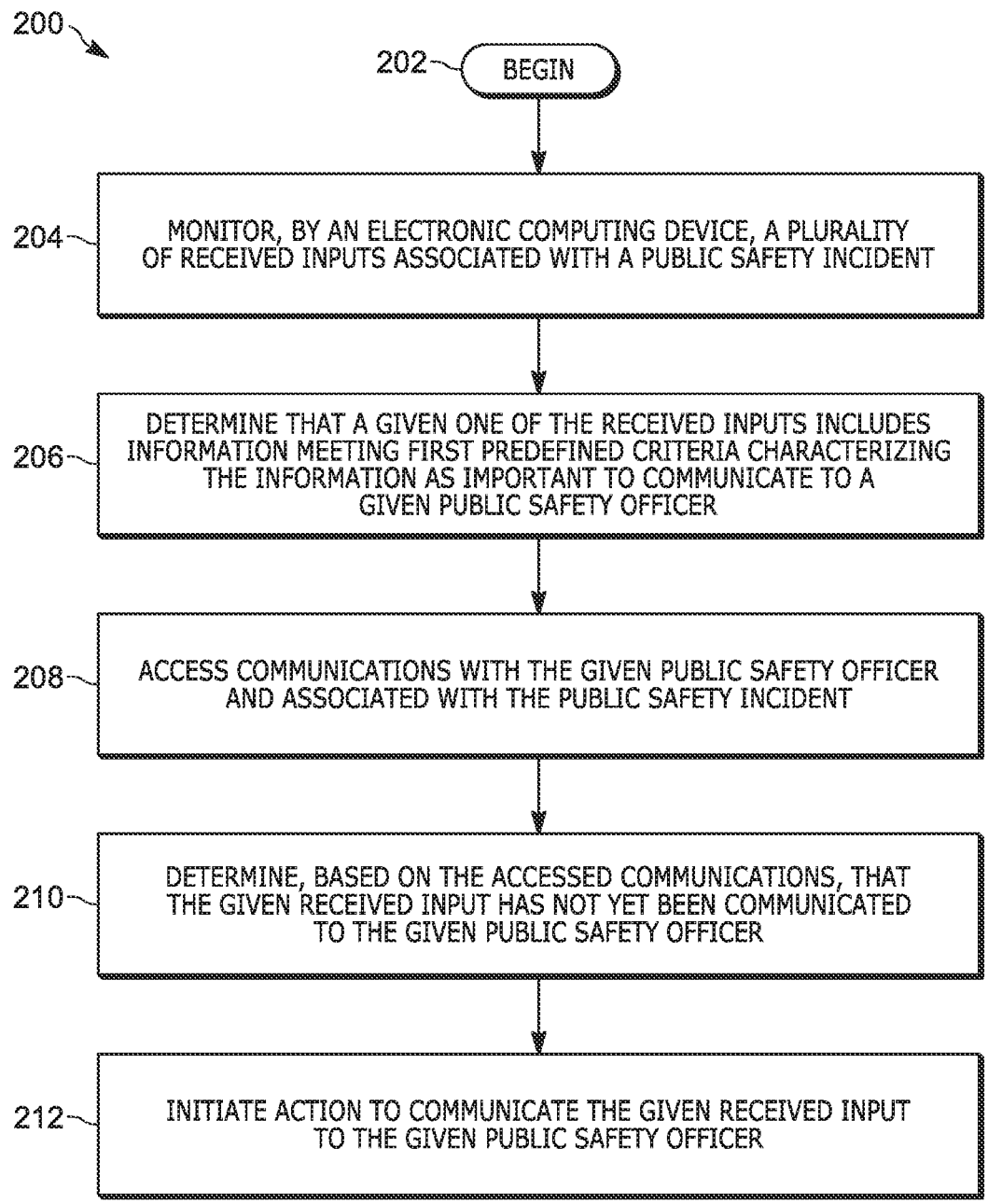
FIG. 2 is a flowchart illustrating selected elements of an example method for ensuring relevant information sharing during public safety incidents, in accordance with some embodiments.

FIG. 2 is a flowchart illustrating selected elements of an example method 200 for ensuring relevant information sharing during public safety incidents, in accordance with some embodiments. In at least some embodiments, some or all of the operations shown in FIG. 2 may be performed by a monitoring and analysis system of a public safety communication system, such as monitoring and analysis system 150 illustrated in FIG. 1. In at least some embodiments, the monitoring and analysis system 150 may include a processor and a memory storing instructions that when executed by the processor cause the processor to perform one or more of the operations illustrated in FIG. 2. In other embodiments, monitoring and analysis system 150 may include a hardware state machine or other electronic circuitry configured to perform one or more of the operations illustrated in FIG. 2. While a particular order of operations is indicated in FIG. 2 for illustrative purposes, the timing and ordering of such operations may vary where appropriate without negating the purpose and advantages of the examples set forth in detail throughout the remainder of this disclosure.

In this example embodiment, method 200 begins at block 202 in FIG. 2 and continues at block 204 with monitoring, by an electronic computing device, a plurality of received inputs associated with a public safety incident. For example, in some embodiments, monitoring and analysis system 150 may receive audio or video input from a citizen or public safety officer reporting the incident. In some embodiments, monitoring and analysis system 150 may receive notes added to a CAD record for the incident by a call taker 122. In some embodiments, monitoring and analysis system 150 may receive results of a query of a public safety database or another public information database that are pertinent to the incident, such as information associated with the location of the incident, or information associated with a person involved in the incident, whether a victim, a suspected perpetrator, or another person of interest, such as an owner, employee, or customer, of business at which the incident is taking place or an owner, resident, or guest at a home at which the incident is taking place.

At 206, method 200 includes determining, by the electronic computing device, that a given one of the received inputs includes information meeting first predefined criteria characterizing the information as important to communicate to a given public safety officer. For example, certain information related to officer safety or the safety of other persons at the location of the reported incident may be considered important to communicate to a responding officer who is en route to or at the scene of the incent. The information that is considered important to communication to the officer may be dependent on the incident type. For example, certain phrases or keywords associated with dangerous conditions may be considered to have a higher importance than information that is merely descriptive of the surroundings. In some embodiments, a scoring mechanism may be applied to phrases or keywords included in an audio or video input provided to a call taker 122, as identified by the call taker 122, to a note added to the CAD record by the public safety dispatcher, to a transcription of an incoming call, or to information obtained from a database to determine whether a given received input meets the first predefined criteria characterizing the information as important to communicate to a given public safety officer. The methods for determining when and whether to relay information included in a given received input to a responding officer may be based on predetermined criteria for criticality, sensitivity, risk, efficiency, the identity of a caller reporting a public safety incident, the location of a reported incident, environmental hazards in the vicinity of the reported incident, the incident type, or an identifier or characterization of a suspect or person of interest associated with a reported incident, in various embodiments.

At 208, the method includes accessing, by the electronic computing device, communications with the given public safety officer and associated with the public safety incident. For example, recordings or transcriptions of the communications between the given public safety officer and a public safety dispatcher may be accessed from the CAD system or from a memory in which they are stored, in different embodiments. The communications may include voice or text outputs of a push-to-talk (PTT) device or system, communications to and from a two-way radio, such as a land mobile radio, communications to and from a mobile telephone, and both private communications and group communications, for example.

At 210, method 200 includes determining, by the electronic computing device, based on the accessed communications, that the given received input has not yet been communicated to the given public safety officer. For example, recordings or transcriptions of the communications between the given public safety officer and a public safety dispatcher may be analyzed to determine whether or not each received input that includes information determined to be important to communicate to the officer has, in fact, been relayed to the officer and, in some embodiments, by what method the information was relayed to the officer.

In response to determining that the given received input has not yet been communicated to the given public safety officer, the method includes, at 212, initiating, by the electronic computing device, action to communicate the given received input to the given public safety officer. Initiating action to communicate the given received input to the given public safety officer may include, for example, providing an indication to the public safety dispatcher that the given received input includes important information not yet communicated to the officer, providing data to the officer's vehicle-mounted communication device representing the given received input, or providing an audible alert or audio message to the officer's hand-held communication device indicating that the given received input includes important information for the officer. In some embodiments, the important information may be communicated to the officer via text to voice from an entered note. In some embodiments, a call taker or public safety dispatcher may be prompted to provide an entered note as a text message sent directly to a mobile device associated with the officer.

In some embodiments, the public safety communication system may make a distinction between information that is important to relay to a responding officer and information that is critical to relay to the responding officer. The determination of whether information is important or critical may be incident-type-specific. Examples of information that, for at least certain types of incidents, may be important to be relayed to a responding officer due to meeting first importance threshold criteria may include, but are not limited to, any or all of the following:

Assigned unit changes
Additional unit(s) assigned
Involved person updates (e.g., the addition of a name, description, still image or video)
Routing updates
Incident location updates (e.g., an address)
An outstanding warrant for an involved person
An Environmental hazard at incident location
An onsite officer requesting assistance
The presence of plainclothes or undercover officer(s)

Figure 3:
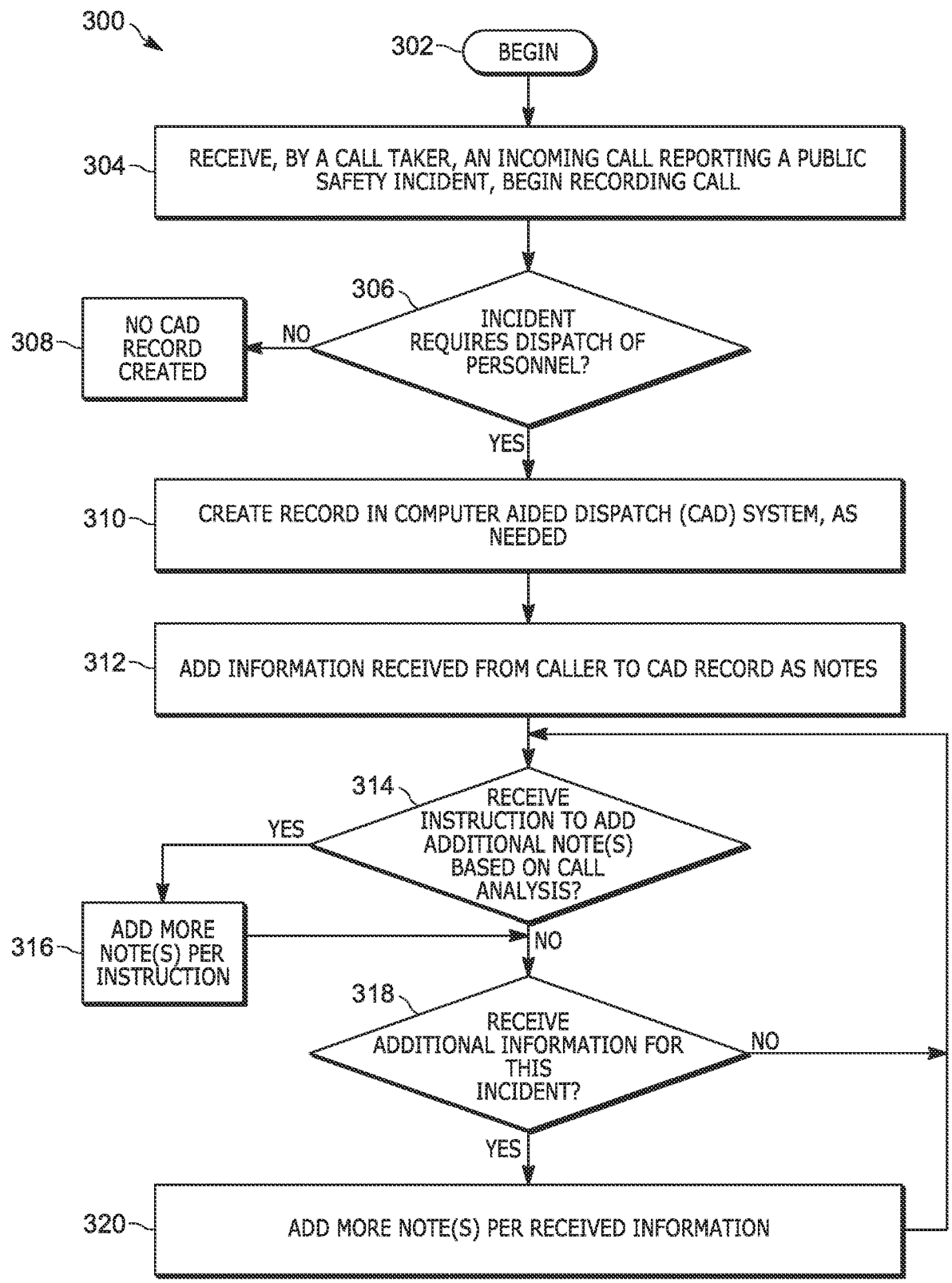
FIG. 3 is a flowchart illustrating selected elements of an example method for handling an incoming call reporting a public safety incident, in accordance with some embodiments

Examples of information that, for at least certain types of incidents, may be critical to be relayed to a responding officer using a preferred communication method due to meeting second critical threshold criteria may include, but are not limited to, any or all of the following:

Officer safety updates
Incident type updates (e.g., an escalation of an initial incident to a more dangerous one or a correction of an initially entered incident type)
Injury updates (e.g., involving officers or citizens)
Report of shots fired
A report of an officer down
A major environmental hazard at incident location
A history of violence for an involved person
A report of weapon(s) at an incident location FIG. 3 is a flowchart illustrating selected elements of an example method for handling an incoming call reporting a public safety incident, in accordance with some embodiments. In at least some embodiments, the operations shown in FIG. 3 may be performed by a call taker 122 in conjunction with components of a public safety communication system, such as public safety communication system 100 illustrated in FIG. 1. For example, a call taker 122 may use a head mounted communication device 124 to receive an incoming phone call reporting a public safety incident and to communicate with the person reporting the incident. The call taker 122 may interact with a call taker communication system 120 to create or add notes to a record in a CAD system 140 for the reported incident. In some embodiments, the call taker 122 may receive instruction from a monitoring and analysis system 150, e.g., through an interface of communication system 120, indicating that additional information included in a recording or transcription of an incoming call should be added to the record in the CAD system 140 for the reported incident. In various embodiments, any or all of the head mounted communication device 124, communication system 120, CAD system 140, radio system 130, or monitoring and analysis system 150 may include a processor and a memory storing instructions that when executed by the processor cause the processor to perform one or more of the operations illustrated in FIG. 3. In other embodiments, the head mounted communication device 124, communication system 120, CAD system 140, radio system 130, or monitoring and analysis system 150 may include a hardware state machine or other electronic circuitry configured to perform one or more of the operations illustrated in FIG. 3. While a particular order of operations is indicated in FIG. 3 for illustrative purposes, the timing and ordering of such operations may vary where appropriate without negating the purpose and advantages of the examples set forth in detail throughout the remainder of this disclosure.

In this example embodiment, method 300 begins at block 302 in FIG. 3 and continues at block 304 with receiving, by a call taker 122, an incoming call reporting a public safety incident, and beginning to record the incoming call. For example, in some embodiments, a call taker 122 may speak with a citizen or public safety officer who calls a public safety hotline, such as a 911 emergency call center, to report a public safety incident. The call taker 122 may receive information from the caller describing the incident, its location, and any involved persons, and may prompt the caller to provide additional information to assist in coordinating an appropriate response.

If, at 306, it is determined that the reported incident requires the dispatch of public safety personnel, method 300 continues at 310 with creating a new record associated with the reported incident in the CAD system 140, as needed. For example, in some embodiments, if a record associated with the reported incident has already been created, the operation shown as 308 may be elided. In some embodiments, a new record may, by default, be created in the CAD system 140 by the call taker 122 or automatically by the communication system 120 in response to every incoming call regardless of whether a record associated with the reported incident already exists in CAD system 140. In some embodiments, the call taker 122 or the communication system 120 may determine, based on the content and context of the incoming call, whether the reported incident requires the dispatch of public safety personnel.

If, at 306, it is determined that the reported incident does not require the dispatch of public safety personnel, no CAD record may be created, as in 308. In other embodiments, a record may be created in CAD system 140 by the call taker 122 or automatically by the communication system 120 in response to every incoming call regardless of whether the reported incident requires the dispatch of public safety personnel. In some embodiments, records may be created or updated in a system other than CAD system 140 for reported incidents that do not require the dispatch of public safety personnel.

At 312, method 300 includes adding information received from the caller to the record in CAD system 140 associated with the reported incident as one or more notes. For example, in some embodiments, information received from caller may be entered into the record by the call taker 122 through a keyboard, graphical user interface, or other user input mechanism of communication system 120. In some embodiments, if a caller transmits audio or video input to the call taker 122, the call taker 122 may add such inputs to the record in CAD system 140 associated with the reported incident. For example, the caller may be a public safety officer who transmits audio or video input to the call taker 122 from a hand-held device through radio system 130.

If, at 314, the call taker 122 receives instruction to add one or more additional notes to the record in CAD system 140 associated with the reported incident based on an analysis of the incoming call, method 300 proceeds to 316. Otherwise, method 300 continues at 318. For example, in some embodiments, the call taker 122 may receive instruction from the monitoring and analysis system 150 to add a note for information identified in a recording or transcription of the incoming call that was not previously noted in the record in CAD system 140 associated with the reported incident. At 316, the caller taker 122 may add the one or more additional notes according to the received instruction.

If, at 318, additional information associated with the reported incident is received, the method proceeds to 320, where one or more notes are added to the record in CAD system 140 in accordance with the received information. For example, additional information associated with the reported incident may be received from same person who originally reported the incident during the same call or in a subsequently received incoming call or from a different person at the scene or otherwise having knowledge of the reported incident as it develops. In some embodiments, there may be multiple callers communicating with a single caller taker 122 at one time, such as two different neighbors reporting the domestic violence incident in progress. In some embodiments, multiple incoming calls may be received for a single public safety incident and each may be handled by a different call taker 122.

As illustrated in FIG. 3, method 300 may return to 314, after which one or more of the operations shown as 314 through 320 may be repeated, as appropriate, if any instructions to add notes are received (at 314) or any additional information is received from another source (at 318).

In some embodiments, all information added to a record in CAD system 140 associated with a reported public safety incident by a call taker 122 may be accessible immediately by the monitoring and analysis system 150. In some embodiments, the communication system 120, monitoring and analysis system 150, or another component of a public safety communication system may generate transcriptions of incoming calls and store them in a memory accessible by monitoring and analysis system 150. In some embodiments, the transcribing may take place in real time during the incoming calls.

Figure 4:
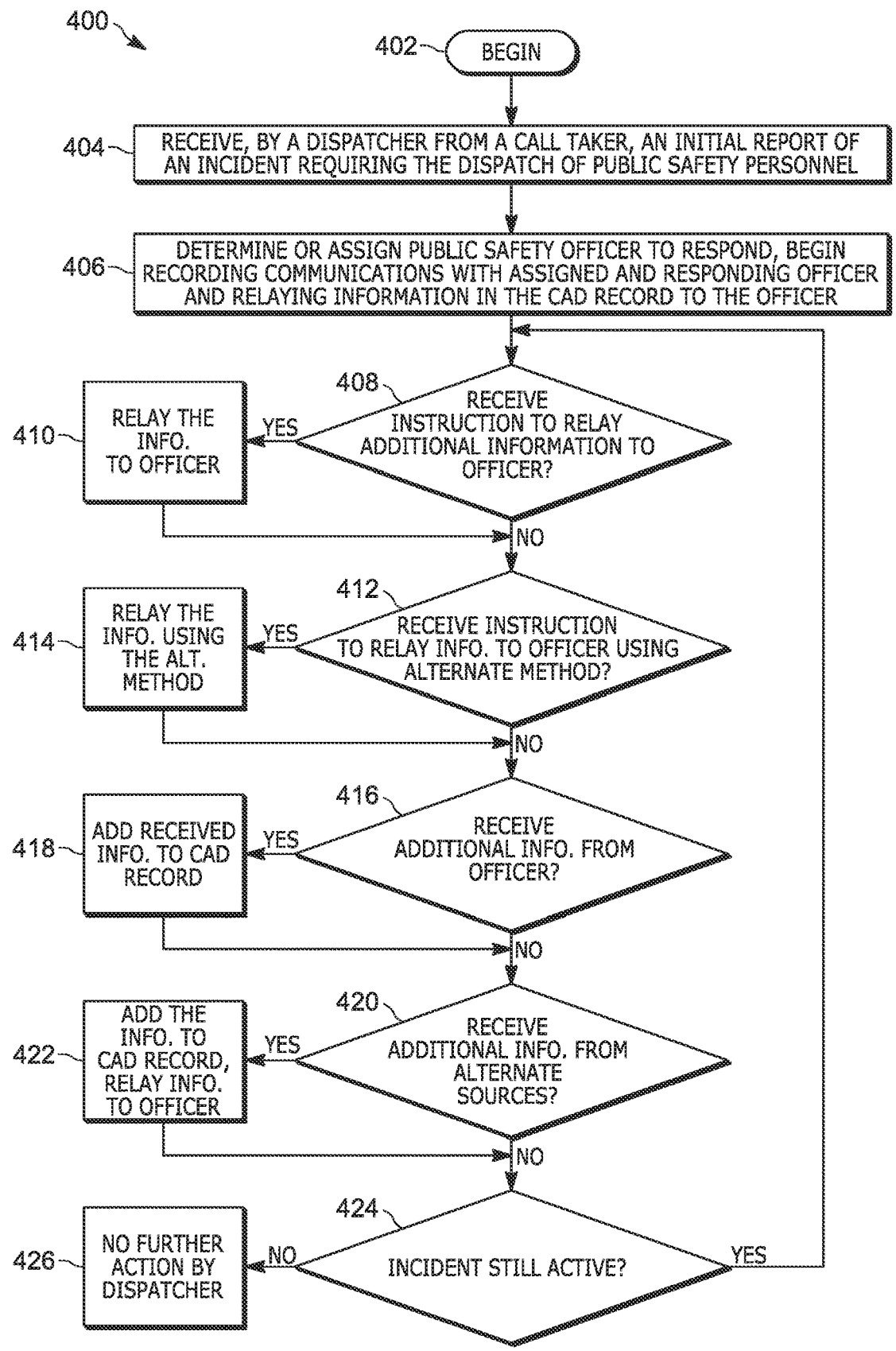
FIG. 4 is a flowchart illustrating selected elements of an example method for communicating with a public safety officer responding to a reported incident, in accordance with some embodiments.

FIG. 4 is a flowchart illustrating selected elements of an example method 400 for communicating with a public safety officer responding to a reported incident, in accordance with some embodiments. In at least some embodiments, the operations shown in FIG. 4 may be performed by a public safety dispatcher in conjunction with components of a public safety communication system, such as public safety communication system 100 illustrated in FIG. 1. For example, a public safety dispatcher 122 may use a head mounted communication device 124 to provide assignment, location, and other pertinent information about a reported public safety incident to a responding officer 102 over public safety radio system 130 and may interact with a dispatcher communication system 120 to relay notes that were added to a record in CAD system 140 associated with the reported incident to a display of the responding officer's vehicle-mounted electronic communication device 110 or to the officer's hand-held electronic communication device 115, among other operations. In some embodiments, a public safety dispatcher 122 may receive instruction from monitoring and analysis system 150 indicating that information determined to be important or critical should be relayed to the responding officer 102 and, in some cases, specifying the method for relaying the important or critical information. In various embodiments, any or all of the head mounted communication device 124, communication system 120, CAD system 140, radio system 130, vehicle-mounted electronic communication device 110, hand-held electronic communication device 115, or monitoring and analysis system 150 may include a processor and a memory storing instructions that when executed by the processor cause the processor to perform one or more of the operations illustrated in FIG. 4. In other embodiments, the head mounted communication device 124, communication system 120, CAD system 140, radio system 130, vehicle-mounted electronic communication device 110, hand-held electronic communication device 115, or monitoring and analysis system 150 may include a hardware state machine or other electronic circuitry configured to perform one or more of the operations illustrated in FIG. 4. While a particular order of operations is indicated in FIG. 4 for illustrative purposes, the timing and ordering of such operations may vary where appropriate without negating the purpose and advantages of the examples set forth in detail throughout the remainder of this disclosure.

In this example embodiment, method 400 begins at block 402 in FIG. 4 and continues at block 404 with receiving, by a public safety dispatcher 122 from a call taker, or from a call taker communication system 120, an initial report of a reported public safety incident requiring the dispatch of public safety personnel. For example, in some embodiments, in response to the creation of a new record in CAD system 140 associated with a reported public safety incident, the dispatcher may be provided with an indication of the creation of the record or a link with which to access the record in CAD system 140.

At 406, the method includes determining and/or assigning a given public safety officer 102 to respond to the reported public safety incident and beginning to record communications with the assigned and responding officer 102 and to relay information in the record in CAD system 140 associated with the reported incident to the responding officer 102. For example, the method may include beginning to relay information that was added to the record in CAD system 140 by the call taker to the responding officer 102 by entering instructions into the CAD system 140 to cause one or more notes to appear on display of vehicle-mounted electronic communication device 110 associated with the responding officer 102 or by relaying the selected notes to a hand-held electronic communication device 115 associated with the responding officer 102 verbally using public safety radio system 130. In some embodiments, the notes to be relayed to the responding officer 102 may be selected by the public safety dispatcher 122 from the information that has been entered into the record in the CAD system associated with the reported incident by the call taker, information that has been entered into the record by the public safety dispatcher, information that has been entered into the record after being obtained from other sources, such as results of a public safety database query.

If, at 408, instructions to relay additional information to the responding officer 102 are received, method 400 proceeds to 410, where the additional information is relayed to the responding officer 102. For example, such instructions may be received from monitoring and analysis system 150 in response to a determination that important information identified in a received input has not yet been relayed to the responding officer 102. In some embodiments, the instruction may be provided by setting a flag on a particular note in the record in CAD system 140 indicating that the note should have been, but has not yet been, communicated to the responding officer 102. In response to the flag being set, the public safety dispatcher may enter an instruction to CAD system 140 causing the particular note that has been flagged to be sent to a display of a vehicle-mounted electronic communication device 110 associated with the responding officer 102, if the responding officer 102 is in the vehicle, or to a hand-held electronic communication device 115, if the responding officer 102 is not in the vehicle. If, at 408, no instruction to relay additional information to the responding officer is received, method 400 continues at 412.

If, at 412, instructions to relay information to the responding officer 102 using an alternate communication method are received, method 400 proceeds to 414, where the information is relayed to the responding officer 102 using the specified alternate method. In some embodiments, such instructions may be received from monitoring and analysis system 150 in response to a determination that critical information identified in a received input has been relayed to the responding officer 102 using a method other than a preferred method for relaying critical information to the responding officer 102. In one example, the critical information may have been sent to a display of a vehicle-mounted electronic communication device 110, but the preferred method for relaying critical information to the responding officer 102 may include providing an audible alert or audio message to a hand-held electronic communication device 115 associated with the responding officer 102 indicating that a given received input includes critical information for the officer or providing an audible alert or audio message representing the given received input to the hand-held electronic communication device 115. In some embodiments, the preferred method for relaying critical information to the responding officer 102 may be dependent on whether or not the responding officer 102 is in a vehicle and in a position to observe information presented to the responding officer 102 on a display of a vehicle-mounted electronic communication device 110. For example, if the responding officer 102 is in the vehicle and is not driving, providing data representing the critical information to the display of the vehicle-mounted electronic communication device may be appropriate or even preferred. However, if the responding officer 102 is not in the vehicle or is driving and unable to read notes representing critical information displayed on the vehicle-mounted electronic communication device 110, the preferred method for relaying the critical information to the responding officer 102 may include providing the critical information to the hand-held electronic communication device 115 associated with the responding officer 102, as described above. In some embodiments, instructions received from monitoring and analysis system 150 in response to a determination that critical information identified in a given received input has not been relayed to the responding officer 102 using the preferred method for relaying critical information may cause communication system 120 or CAD system 140 to send an audible alert or an audio message representing the given received input, such as a portion of a recording of an incoming call including the critical information or a simulated voice reciting a note in the record in CAD system 140 representing the critical information, to the hand-held electronic communication device 115 through public safety radio system 130 automatically as a push notification. If, at 412, no instructions to relay information to the responding officer 102 using an alternate communication method are received, method 400 continues at 416.

If, at 416, additional information associated with the reported incident is received from the responding officer 102, or from another responding officer 102, method 400 proceeds to 418, where the received information is added to the record in CAD system 140 associated with the reported incident. Otherwise, the method continues at 420. For example, the additional information may be provided by the responding officer 102 to the public safety dispatcher 122 using radio system 130. In some embodiments, the communication may be recorded and transcribed. The resulting recording and transcription may be added to the record in CAD system 140 associated with the reported incident and/or stored in a memory accessible by monitoring and analysis system 150. For example, in some embodiments, monitoring and analysis system 150, or another component of a public safety communication system, may generate and store transcriptions of communications between a public safety dispatcher 122 and a responding officer 102. In some embodiments, the transcribing may take place in real time during the communications.

If, at 420, additional information associated with the reported incident is received from alternate sources, method 400 proceeds to 422. Otherwise, the method continues at 424. At 422, the received information is added to the record in CAD system 140 associated with the reported incident and is relayed to the responding officer 102. For example, if the public safety dispatcher 102 obtains information as a result of a query of a public safety database or another public information database that is pertinent to the reported incident, such as information associated with the location of the incident, or information associated with a person involved in the incident, whether a victim, a suspected perpetrator, or another person of interest, such as an owner, employee, or customer, of business at which the incident is taking place or an owner, resident, or guest at a home at which the incident is taking place, this information may be added to the record in CAD system 140 associated with the reported incident and relayed to the responding officer 102. In some embodiments, queries of public safety databases or other public information databased may be performed by a call taker rather than, or in addition to, being performed by a public safety dispatcher.

If, at 424, the reported incident is no longer active, method 400 proceeds to 426, where no further action is taken by the public safety dispatcher. Otherwise, method 400 returns to 408, after which one or more of the operations shown in 408-426 may be performed, as appropriate, while the reported incident remains active.

In some embodiments, all information added to a record in CAD system 140 associated with a reported public safety incident by a public safety dispatcher 122 may be made accessible immediately by the monitoring and analysis system 150 for use in ensuring relevant information sharing during public safety incidents.

Figure 5:
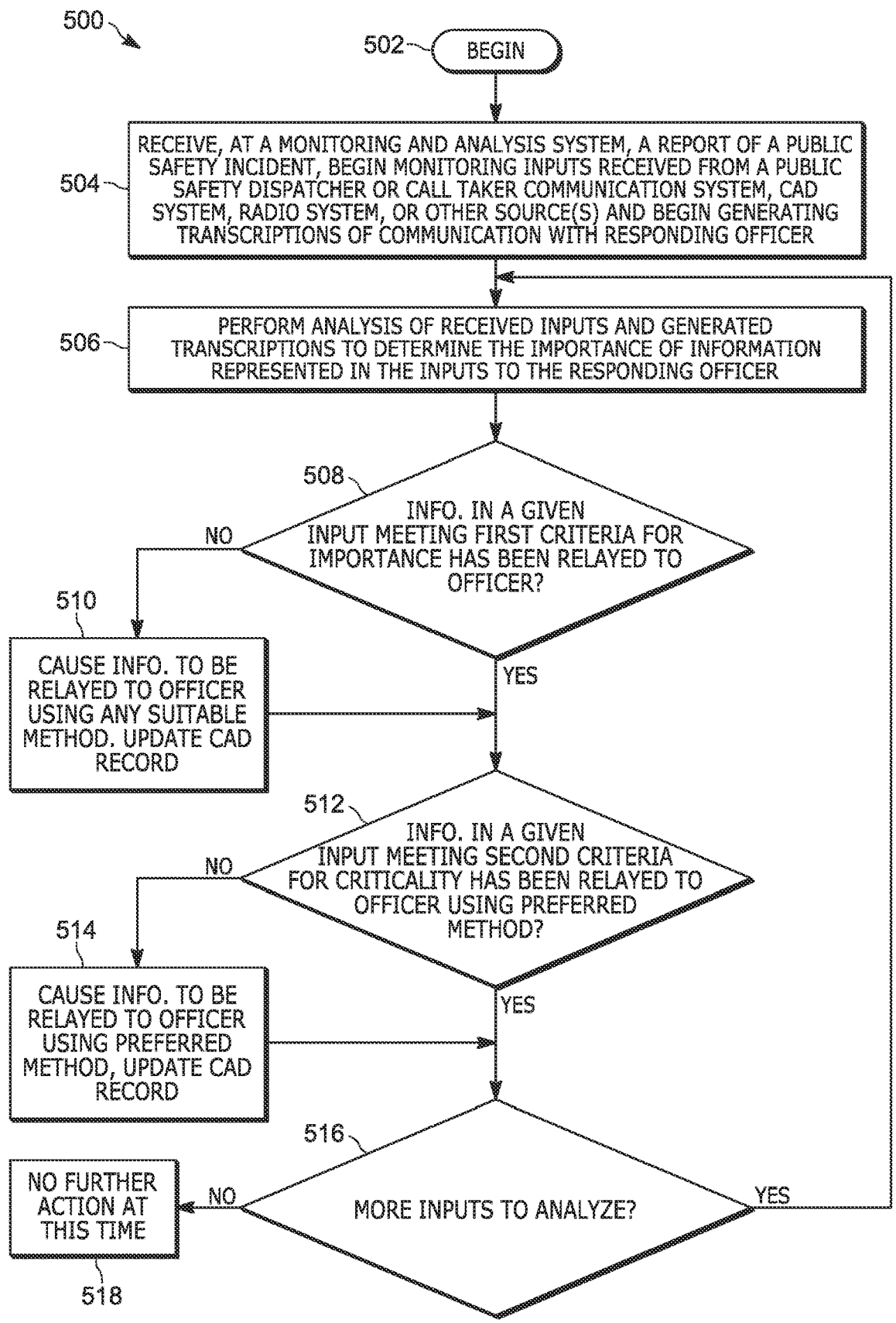
FIG. 5 is a flowchart illustrating selected elements of an example method for analyzing information received during a public safety incident and ensuring that important and critical information have been appropriately relayed to the responding officer, in accordance with some embodiments.

FIG. 5 is a flowchart illustrating selected elements of an example method for analyzing information received during a public safety incident and ensuring that important and critical information have been appropriately relayed to the responding officer, in accordance with some embodiments. In at least some embodiments, some or all of the operations shown in FIG. 5 may be performed by a monitoring and analysis system of a public safety communication system, such as monitoring and analysis system 150 illustrated in FIG. 1. In at least some embodiments, the monitoring and analysis system 150 may include a processor and a memory storing instructions that when executed by the processor cause the processor to perform one or more of the operations illustrated in FIG. 5. In other embodiments, monitoring and analysis system 150 may include a hardware state machine or other electronic circuitry configured to perform one or more of the operations illustrated in FIG. 5. While a particular order of operations is indicated in FIG. 5 for illustrative purposes, the timing and ordering of such operations may vary where appropriate without negating the purpose and advantages of the examples set forth in detail throughout the remainder of this disclosure.

In this example embodiment, method 500 begins at block 502 in FIG. 5 and continues at block 504 with receiving, at a monitoring and analysis system 150, a report of a public safety incident, beginning to monitor inputs received from a public safety dispatcher or call taker communication system 120, a CAD system 140, a radio system 130, or one or more other sources of inputs associated with the public safety incident, and beginning to generate transcriptions of communication between a public safety dispatcher 122 and a responding officer 102. For example, in some embodiments, in response to the creation of a new record in CAD system 140 associated with the reported public safety incident, the monitoring and analysis system 150 may be provided with an indication of the creation of the record in CAD system 140.

At 506, method 500 includes performing an analysis of the received inputs and generated transcriptions to determine the importance of the information represented in each of the received inputs and generated transcriptions to the responding officer. For example, analytics may be applied to the received inputs and generated transcriptions automatically, either periodically or in response to receiving one or more inputs associated with the reported incident, in various embodiments.

If, at 508, it is determined that information included in a given received input meeting first predefined criteria for importance to the responding officer 102 has not yet been relayed to the responding officer 102, method 500 proceeds to 510. Otherwise, the method continues at 512.

At 510, method 500 includes causing the information included in the given received input and meeting the first predefined criteria for importance to be relayed to the responding officer 102 using any suitable method for relaying the information to the responding officer 102 and updating the record in the CAD system 140 associated with the reported incident. This may include, for example, the monitoring and analysis system 150 providing instructions to a call taker to enter an additional note including the important information in the record in CAD system 140 associated with the reported incident, providing instructions to CAD system 140 to push a note including the important information to the display of a vehicle-mounted electronic communication device 110 associated with the responding officer 102, or providing instructions to a dispatcher to relay the important information to a hand-held electronic communication device 115 associated with the responding officer 102 verbally using public safety radio system 130. In some embodiments, a representation of the instructions provided by the monitoring and analysis system 150 to the call taker, CAD system 140 or dispatcher, and a representation of any resulting communication with the responding officer 102, may be added to the record in CAD system 140 associated with the reported incident.

If, at 512, it is determined that information included in a given received input meeting second predefined criteria for criticality to the responding officer 102 has not yet been relayed to officer using a preferred method for relaying critical information to the responding officer 102, method 500 proceeds to 514. Otherwise, the method continues at 516.

At 514, method 500 includes causing the information included in the given received input and meeting the second predefined criteria for criticality to be relayed to the responding officer 102 using the preferred method for relaying critical information and updating the record in the CAD system 140, as described above in reference to FIG. 4. This may include, for example, the monitoring and analysis system 150 providing instructions to the dispatcher or to CAD system 140 to relay the critical information to the responding officer 102 using the preferred method in response to a determination that the critical information has not yet been relayed to the responding officer 102 or in response to a determination that the critical information has been relayed to the responding officer 102 using a method other than the preferred method for relaying critical information to the responding officer 102. In some embodiments, a representation of the instructions provided by the monitoring and analysis system 150 to the dispatcher or CAD system 140, and a representation of any resulting communication with the responding officer 102, may be added to the record in CAD system 140 associated with the reported incident.

If, at 516, there are no additional inputs to be analyzed, method 500 proceeds to 518 and no further action may be taken. If, however, there are additional inputs to be analyzed, the method may return to 506, after which one or more of the operations shown as 508-518 may be performed, as appropriate, based on an analysis of each additional input.

Figure 6:
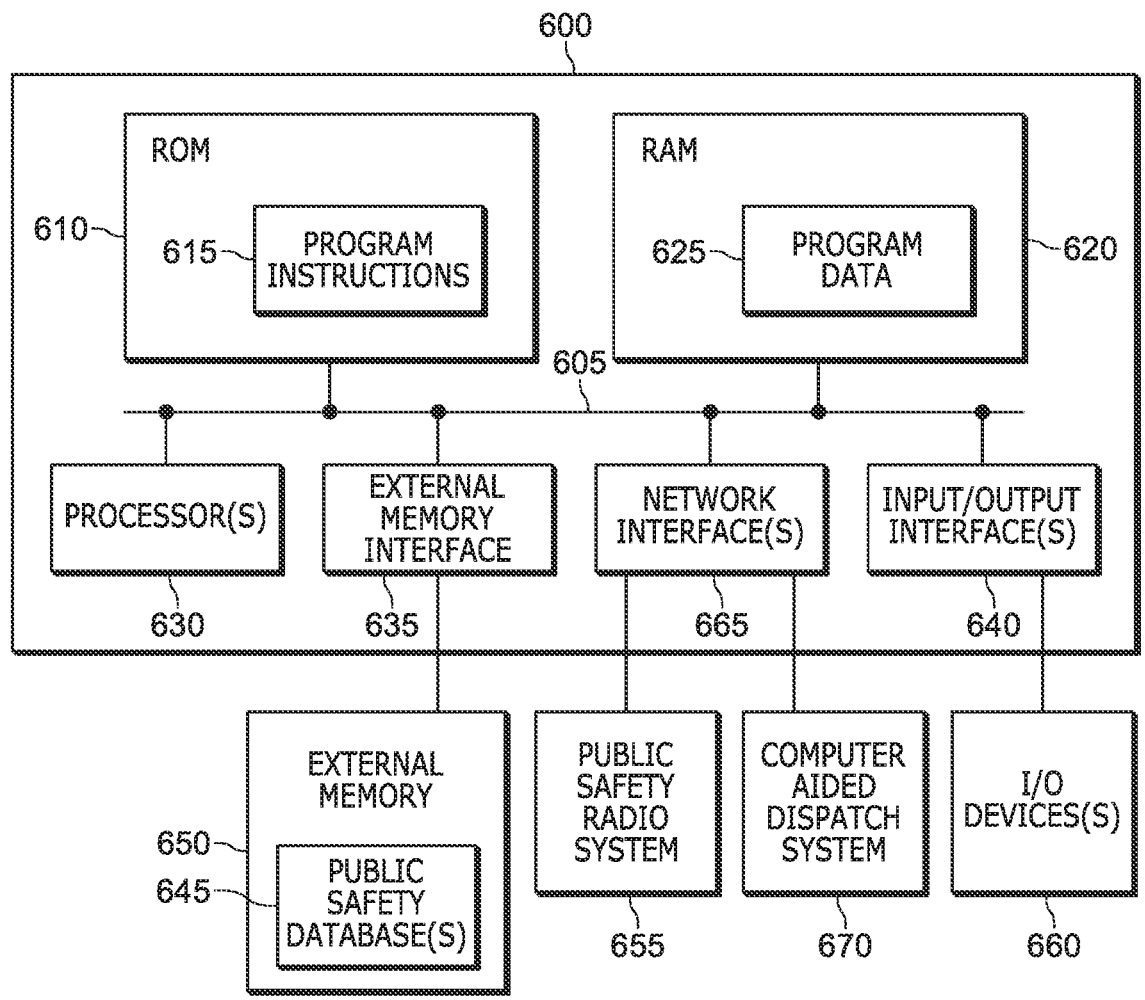
FIG. 6 is a block diagram illustrating selected elements of an example monitoring and analysis system for public safety communication, in accordance with some embodiments.

FIG. 6 is a block diagram illustrating selected elements of an example monitoring and analysis system 600 for public safety communication, in accordance with some embodiments. In various embodiments, monitoring and analysis system 600 may be similar to monitoring and analysis system 150 illustrated in FIG. 1 and described herein. In the illustrated example, monitoring and analysis system 600 includes a Read Only Memory (ROM) 610, a Random Access Memory (RAM) 620, one or more electronic processors 630, one or more input/output device interfaces 640 for communicating with locally attached devices and components, an external memory interface 635 through which monitoring and analysis system 600 may be coupled to an external memory 650, and one or more network interfaces 665, all of which are coupled to a system bus 605 through which they communicate with each other. External memory 650 may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, an electronic processor 630 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 610 stores program instructions 615, at least some of which may be executed by the electronic processor 630 to perform the methods described herein. For example, in various embodiments, at least some of the operations of method 200 illustrated in FIG. 2, method 300 illustrated in FIG. 3, method 400 illustrated in FIG. 4, and method 500 illustrated in FIG. 5, as described above, may be performed by, or in conjunction with, program instructions 615 executing on an electronic processor 630 of the monitoring and analysis system 600.

In some embodiments, program instructions 615 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 615 may include program instructions that when executed by electronic processor 630 implement other functionality features of monitoring and analysis system 600.

In this example embodiment, RAM 620 may, from time to time, store program data 625 including, without limitation, data representing inputs associated with various reported public safety incidents, data obtained from one or more public safety databases, data representing incoming calls or communications between a dispatcher and a responding officer, including, but not limited to, transcriptions of audio or video communications, data representing criteria for classifying received inputs as important or critical to provide to officers responding to public safety incidents of particular types, and/or other data accessible by program instruction 615 and used in performing the methods described herein. In some embodiments, any or all of this information may be stored in a programmable non-volatile memory, such as in external memory 650. In some embodiments, an external memory 650 may, at certain times, store one or more public safety databases 645 or data retrieved from one or more public safety databases. In some embodiments, monitoring and analysis system 600 may access one or more public safety databases through a network interface 665 and may receive and store results of queries directed to those public safety databases in RAM 620 or on external memory 650. In some embodiments, RAM 620 may, from time to time, store local copies of all or a portion of program instructions 615 or other program instructions copied from ROM 610 and/or copied from external memory 650 over external memory interface 635.

In this example embodiment, input/output device interfaces 640 may include one or more analog input interfaces, such as one or more analog-to-digital (A/D) convertors, or digital interfaces for receiving signals or data from, and sending signals or data to, one or more input/output devices 660. In various embodiments, input/output device interfaces 640 may operate to allow monitoring and analysis system 600 to receive user input from and to provide data and instructions to a user of monitoring and analysis system 600, such as an administrator of a public safety communication system. User input may be provided, for example, via a keyboard or keypad, soft keys, icons, or soft buttons on a touch screen of a display, a scroll ball, a mouse, buttons, a microphone and the like (not shown in FIG. 6). In some embodiments, input/output device interfaces 640 may include a graphical user interface (GUI) generated, for example, by electronic processor 630 from program instructions 615 and program data 625 and presented on a display, enabling a user to interact with the display. Input/output device interfaces 640 may also include other input mechanisms, which for brevity are not described herein and which may be implemented in hardware, software, or a combination of both.

Any or all input/output devices 660 may be configured to send data to or receive data from monitoring and analysis system 600 over one or more data lines through input/output interfaces 640, in various embodiments. Similarly, any or all input/output devices 660 may be configured to assert or receive a control signal from monitoring and analysis system 600 over one or more connections through input/output interfaces 640. In response to receiving various inputs from input/output devices 660, the electronic processor 630 of monitoring and analysis system 600 may execute program instructions to ensure relevant information sharing during public safety incidents, as described herein.

Monitoring and analysis system 600 may support one or more types of communication including, but not limited to, audio communication and data communication, using one or more types of transmission including, but not limited to standing wave radio transmission, land mobile radio (LMR) transmission, and long-term evolution (LTE) transmission. In some embodiments that are deployed by public safety organizations, communications for mission critical operations may include, but are not limited to, communications over a high-powered land mobile radio network or a public safety long-term evolution (PS LTE) network. In some embodiments, an analog audio signal may be received and converted to a digital audio signal and processed by one or more components of monitoring and analysis system 600, including but not limited to an analog-to-digital converter (ADC) and a digital signal processor (DSP). For example, electronic processor 630 may include digital signal processing functionality. In some embodiments, circuitry within monitoring and analysis system 600, such as an ADC or a DSP, may be configured to apply one or more signal processing techniques to a received audio signal in order to perform speech recognition for transcribing an incoming call or a radio communication between a dispatcher and a responding officer.

Each network interface 665 may be a suitable system, apparatus, or device operable to serve as an interface between electronic processor 630 and a network. In some embodiments, a network interface 665 may enable monitoring and analysis system 600 to communicate with a server or a remote device over a network using a suitable transmission protocol and/or standard, including, but not limited to, transmission protocols and/or standards enumerated below with respect to the discussion of the network. For example, monitoring and analysis system 600 may communicate with public safety radio system 655 and computer aided dispatch system 670 over respective network interfaces 665. In some embodiments, other server systems, client systems, or remote devices not shown in FIG. 6 including, but not limited to, various call taker or dispatcher communication systems 120, head mounted communication devices 124, vehicle-mounted electronic communication devices 110, or hand-held electronic communication devices 115, may communicate directly with monitoring and analysis system 600 via a network interface 665 rather than through public safety radio system 655 or computer aided dispatch system 670.

In some embodiments, a network interface 665 may be communicatively coupled via a network to a network storage resource (not shown in FIG. 6). The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof. Each network interface 665 may enable wired and/or wireless communications to and/or from monitoring and analysis system 600 or other elements of a public safety communication system. In various embodiments, a monitoring and analysis system 150 may include more, fewer, or different elements than those of monitoring and analysis system 600 illustrated in FIG. 6.

In some embodiments, public safety radio system 655 or CAD system 670 may include elements similar to the elements of monitoring and analysis system 600 illustrated in FIG. 6. For example, public safety radio system 655 may include any or all of a ROM 610, a RAM 620 storing program data 625, an electronic processor 630, an external memory interface 635, one or more network interfaces 665, and one or more input/output interfaces 640, among other elements. In one such embodiment, ROM 610 stores program instructions 615, at least some of which may be executed by the electronic processor 630 to implement various functionality features of the public radio safety system 655. In another example, CAD system 670 may include any or all of a ROM 610, a RAM 620 storing program data 625, an electronic processor 630, an external memory interface 635, one or more network interfaces 665, and one or more input/output interfaces 640, among other elements. In one such embodiment, ROM 610 stores program instructions 615, at least some of which may be executed by the electronic processor 630 to implement various functionality features of the CAD system 140.

Similarly, in some embodiments, a call taker or dispatcher communication system 120, vehicle-mounted electronic communication device 110, or hand-held electronic communication device 115 may include any or all of a ROM 610 storing program instructions 615 for implementing functionality features of the a call taker or dispatcher communication system 120, vehicle-mounted electronic communication device 110, or hand-held electronic communication device 115, a RAM 620 storing program data 625, an electronic processor 630, an external memory interface 635, a network interface 665, and one or more input/output interfaces 640, among other elements.

While specific examples of public safety communication systems, and components thereof, public safety incidents, information that is important or critical to be relayed to a responding public safety officer, and methods for relaying important or critical information to a responding officer are described herein, in other embodiments, the methods an apparatus described herein may be applied in public safety communication systems including more, fewer, or different components and in which call takers, public safety dispatchers and public safety officers are tasked with handling different types of public safety incidents in which different types of information may be considered important or critical to be relayed to a responding public safety officer.

The methods and apparatus described herein for monitoring incoming calls reporting public safety incidents and notes entered into a record associated with those incidents, analyzing these and other inputs to determine the importance or criticality of the information included in the received inputs, cross-referencing any important or critical information with communications between public safety dispatchers and responding officers to determine whether the important or critical information has been relayed to the responding officer using an appropriate communication method, and taking action to cause the important or critical information to be relayed to the responding officer if this has not already been done may provide benefits to public safety agencies in terms of officer safety, operational efficiency, and accountability through improved record keeping. For example, by applying real-time analytics to the inputs and communications associated with a reported public safety incident, officers may be provided with better information and a more complete record of the reported incident than is currently possible with existing staffing and siloed information systems. By ensuring relevant information sharing during public safety incidents, public safety officers may be able spend less time gathering information and more time providing on-scene services, while being kept safe through the timely and appropriate communication of important and critical information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for ensuring relevant information sharing during public safety incidents, comprising:
   monitoring, by an electronic computing device, a plurality of received inputs associated with a public safety incident;
   determining, by the electronic computing device, that the content of a given one of the received inputs comprises information meeting first predefined criteria characterizing the information as important to communicate to a responding public safety officer;
   accessing, by the electronic computing device, information representing previous communications with the responding public safety officer that are associated with the public safety incident;
   determining, by the electronic computing device based on the accessed information representing the previous communications, that the given received input has not yet been communicated to the responding public safety officer; and
   initiating, by the electronic computing device and in response to determining that the given received input has not yet been communicated to the responding public safety officer, action to communicate the given received input to the responding public safety officer.

2. The method of claim 1, wherein the responding public safety officer is en route to or on site at the public safety incident.

3. The method of claim 1, wherein the given received input comprises audio or video input comprising the information meeting the first predefined criteria.

4. The method of claim 1, wherein the given received input comprises a note composed by a public safety dispatcher or a call taker and comprising the information meeting the first predefined criteria, the note representing information provided by a person reporting the public safety incident or information obtained through a query of a database accessible by the public safety dispatcher or call taker.

5. The method of claim 1, wherein:
   the method further comprises transcribing, by the electronic computing device, a call received from a person reporting the public safety incident; and
   the given received input comprises a transcription of the call comprising the information meeting the first predefined criteria.

6. The method of claim 1, wherein:
   the method further comprises at least one of:
      transcribing, by the electronic computing device in real time, radio communications with the responding public safety officer that are associated with the public safety incident; and
      storing, by the electronic computing device, data provided to a display of a vehicle-mounted electronic communication device associated with the responding public safety officer; and
   accessing the information representing the previous communications with the responding public safety officer that are associated with the public safety incident comprises accessing a real-time transcription of radio communications with the responding public safety officer that are associated with the public safety incident or stored data provided to a display of a vehicle-mounted electronic communication device associated with the responding public safety officer.

7. The method of claim 1, wherein initiating action to communicate the given received input to the responding public safety officer comprises providing an indication to the public safety dispatcher that the given received input comprises information meeting the first predefined criteria and that the given received input has not yet been communicated to the responding public safety officer.

8. The method of claim 1, wherein initiating action to communicate the given received input to the responding public safety officer comprises providing data representing the given received input to a display of a vehicle-mounted electronic communication device associated with the responding public safety officer.

9. The method of claim 1, wherein initiating action to communicate the given received input to the responding public safety officer comprises providing an audible alert or audio message representing the given received input to a hand-held electronic communication device associated with the responding public safety officer.

10. The method of claim 9, wherein the audible alert or audio message is provided to the hand-held electronic communication device associated with the responding public safety officer responsive to at least one of:
   a determination, by the electronic computing device, that the content of the given received input comprises information meeting second predefined criteria further characterizing the information as critical to communicate to the responding public safety officer; and a determination, by the electronic computing device, that the responding public safety officer is not in a position to observe data provided to a display of a vehicle-mounted electronic communication device associated with the responding public safety officer.

11. A non-transitory computer readable medium storing program instructions executable by a processor for performing:

monitoring, by an electronic computing device, a plurality of received inputs associated with a public safety incident;

determining, by the electronic computing device, that the content of a given one of the received inputs comprises information meeting first predefined criteria characterizing the information as important to communicate to a responding public safety officer;

accessing, by the electronic computing device, information representing previous communications with the responding public safety officer that are associated with the public safety incident;

determining, by the electronic computing device based on the accessed information representing the previous communications, that the given received input has not yet been communicated to the responding public safety officer; and initiating, by the electronic computing device and in response to determining that the given received input has not yet been communicated to the responding public safety officer, action to communicate the given received input to the responding public safety officer.

12. The computer readable medium of claim 11, wherein the given received input comprises:

audio or video input comprising the information meeting the first predefined criteria; or a note composed by a public safety dispatcher or a call taker and comprising the information meeting the first predefined criteria, the note representing information provided by a person reporting the public safety incident or information obtained through a query of a database accessible by the public safety dispatcher or call taker.

13. The computer readable medium of claim 11, wherein:

the program instructions are further executable by the processor for performing transcribing a call received from a person reporting the public safety incident; and the given received input comprises a transcription of the call comprising the information meeting the first predefined criteria.

14. The computer readable medium of claim 11, wherein:

the program instructions are further executable by the processor for performing one or more of:

transcribing, in real time, radio communications with the responding public safety officer that are associated with the public safety incident; and storing data provided to a display of a vehicle-mounted electronic communication device associated with the responding public safety officer; and accessing the information representing the previous communications with the responding public safety officer that are associated with the public safety incident comprises accessing a real-time transcription of radio communications with the responding public safety officer that are associated with the public safety incident or stored data provided to a display of a vehicle-mounted electronic communication device associated with the responding public safety officer.

15. The computer readable medium of claim 11, wherein initiating action to communicate the given received input to the responding public safety officer comprises one or more of:

providing an indication to the public safety dispatcher that the given received input comprises information meeting the first predefined criteria and that the given received input has not yet been communicated to the responding public safety officer;

providing data representing the given received input to a display of a vehicle-mounted electronic communication device associated with the responding public safety officer; and providing an audible alert or audio message representing the given received input to a hand-held electronic communication device associated with the responding public safety officer.

16. The computer readable medium of claim 11, wherein initiating action to communicate the given received input to the responding public safety officer comprises providing an audible alert or audio message representing the given received input to a hand-held electronic communication device associated with the responding public safety officer responsive to one or more of:

a determination that the content of the given received input comprises information meeting second predefined criteria further characterizing the information as critical to communicate to the responding public safety officer; and a determination that the responding public safety officer is not in a position to observe data provided to a display of a vehicle-mounted electronic communication device associated with the responding public safety officer.

17. A public safety communication system, comprising:

one or more input interfaces through which a plurality of received inputs associated with a public safety incident are received;

a monitoring and analysis system comprising:

a processor; and a memory storing program instructions that when executed by the processor cause the processor to perform:

determining that the content of a given one of the received inputs comprises information meeting first predefined criteria characterizing the information as important to communicate to a responding public safety officer;

accessing information representing previous communications with the responding public safety officer that are associated with the public safety incident;

determining, based on the accessed information representing the previous communications, that the given received input has not yet been communicated to the responding public safety officer; and initiating, in response to determining that the given received input has not yet been communicated to the responding public safety officer, action to communicate the given received input to the responding public safety officer.

18. The public safety communication system of claim 17, wherein:

the public safety communication system further comprises:

a public safety radio system;

a vehicle-mounted electronic communication device associated with the responding public safety officer;
an interface through which a public safety database is accessible by a public safety dispatcher or a call taker; and
a memory configured to store transcriptions of communications with public safety officers over the public safety radio system and data provided to displays of vehicle-mounted electronic communication devices associated with public safety officers;

the given received input comprises one or more of:
 audio or video input comprising the information meeting the first predefined criteria;
 a note composed by the public safety dispatcher or call taker and comprising the information meeting the first predefined criteria, the note representing information provided by a person reporting the public safety incident or information obtained through a query of the public safety database; and
 a transcription of a call received from a person reporting the public safety incident comprising the information meeting the first predefined criteria; and accessing the information representing the previous communications with the responding public safety officer that are associated with the public safety incident comprises one or more of:
 accessing, in the memory, a transcription of a communication with the responding public safety officer over the public safety radio system that are associated with the public safety incident; and
 accessing, in the memory, data provided to a display of the vehicle-mounted electronic communication device associated with the responding public safety officer.

19. The public safety communication system of claim 17, wherein:
the public safety communication system further comprises one or more of:
 a vehicle-mounted electronic communication device associated with the responding public safety officer; and
 a hand-held electronic communication device associated with the responding public safety officer; and
initiating action to communicate the given received input to the responding public safety officer comprises one or more of:
 providing an indication to a public safety dispatcher that the given received input comprises information meeting the first predefined criteria and that the given received input has not yet been communicated to the responding public safety officer;
 providing data representing the given received input to a display of the vehicle-mounted electronic communication device associated with the responding public safety officer; and
 providing an audible alert or audio message representing the received input to the hand-held electronic communication device associated with the responding public safety officer.

20. The public safety communication system of claim 17, wherein:
the public safety communication system further comprises a hand-held electronic communication device associated with the responding public safety officer; and
initiating action to communicate the given received input to the responding public safety officer comprises providing an audible alert or audio message representing the given received input to the hand-held electronic communication device associated with the responding public safety officer responsive to one or more of:
 a determination that the content of the given received input comprises information meeting second predefined criteria further characterizing the information as critical to communicate to the responding public safety officer; and
 a determination that the responding public safety officer is not in a position to observe data provided to a display of a vehicle-mounted electronic communication device associated with the responding public safety officer.

* * * * *